Nov. 28, 1944.  H. FIKENTSCHER  2,363,951

PROCESS OF EMULSION-POLYMERIZATION

Filed Oct. 15, 1938

INVENTOR.
Hans Fikentscher
BY
HIS ATTORNEYS

Patented Nov. 28, 1944

2,363,951

UNITED STATES PATENT OFFICE 2,363,951

PROCESS OF EMULSION-POLYMERIZATION

Hans Fikentscher, Ludwigshafen-on-the-Rhine, Germany, assignor, by mesne assignments, to General Aniline & Film Corporation, New York, N. Y., a corporation of Delaware Application October 15, 1938, Serial No. 235,184
In Germany October 23, 1937

5 Claims. (Cl. 260—84)

The present invention relates to an improved process of emulsion-polymerization.

Hitherto it has been possible to carry out the polymerization of polymerizable organic compounds in aqueous emulsion only discontinuously. By the continuous addition to the emulsion of the monomeric compounds in the polymerization vessel, the substances mix very rapidly with the whole content of the polymerization vessel by the movement of the material to be polymerized, for example by stirring or shaking. The result is that a considerable part of the monomeric compounds is present in the polymerization products in a non-polymerized form when the latter are continuously withdrawn.

I have now found that polymerizable organic compounds which are lighter than water can be polymerized in aqueous emulsion with very good yields continuously and in an industrially simple manner by carrying out the polymerization in high columns of liquid, continuously supplying the polymerizable compound and the emulsifying liquid or the ready-made emulsion of the monomer in water at the top, withdrawing the dispersion of the polymerization product formed from the bottom at the same rate and agitating in the uppermost part only of the column of liquid.

Whereas in all hitherto known processes, the whole polymerization material is stirred or moved to obtain the emulsion, it has been found, contrary to expectation, that in the polymerization of polymerizable organic compounds which are lighter than water in aqueous emulsion it is sufficient if the uppermost part only be agitated, especially stirred or otherwise kept in motion.

If any emulsion of the monomeric compounds passes by mixing into the lower, more or less stationary, part of the column of liquid and separates out there by reason of the lack of motion, it rises again to the upper part of the column of liquid by reason of its lower specific gravity than water and is again emulsified by the agitation, for example stirring.

Since the emulsion of the monomeric organic compounds is of lower specific gravity than the emulsion of the polymers, a certain separation into layers takes place in the reaction vessel so that the monomeric compounds become enriched in the upper part of the column of liquid and the polymeric compounds become enriched in the lower part.

Figure 1:
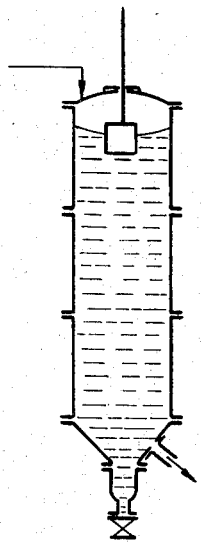
Figure 2:
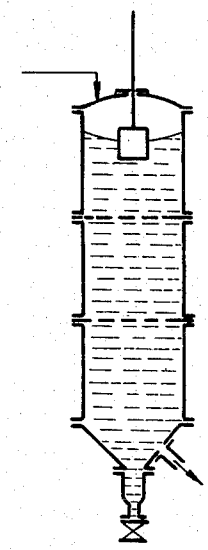
Figure 3:
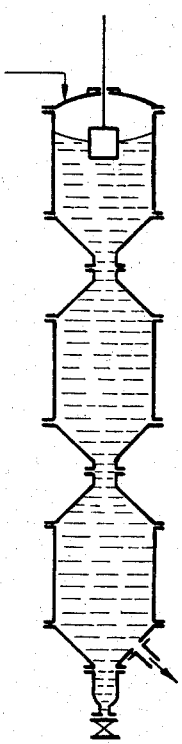
Figure 4:
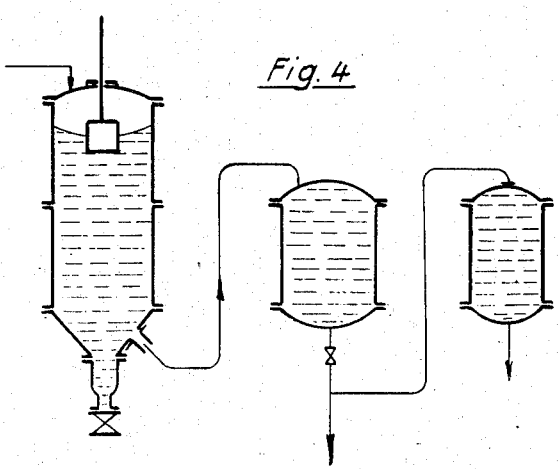

In order to obtain a high column of liquid, it is simplest to work with a tower in which a small stirring device is provided in the uppermost part only. The ratio of the height to the diameter of the said tower may preferably be from 3:1 to 5:1. Such an arrangement is shown diagrammatically in Figure 1 of the accompanying drawing. In order better to limit the upper stirred layer from the lower layer, one or more perforated intermediate plates may be provided in such a tower, as shown diagrammatically in Figure 2. The same effect is also advantageously obtained by arranging a plurality of tubes or towers one below another and making the connecting portions narrower, as shown diagrammatically in Figure 3. In many cases, the towers may also be arranged one by the side of the other, namely when the last polymerizing portion is no longer present in emulsified form, but in dissolved phase, as for example when using vinyl chloride, or when the emulsion has become so stable by the progressive polymerization that no separation into its components takes place in a quiescent state; this arrangement is shown diagrammatically in Figure 4. In this case, stirring devices may also be arranged in the uppermost part of the second or also in the third tower.

Depending on the polymerization temperatures which are necessary for the particular polymerizable organic compounds, the towers may wholly or in parts be provided with heating or cooling device and thus brought to the same or, if desired, to different temperatures. Especially when arranging a plurality of tubes or towers one below another, an acceleration of the polymerization of the last traces of the polymerizable compounds may be effected for example by increasing the temperature in the last vessel.

In order to agitate the uppermost layer of the emulsion it is suitable to use stirrers of any kind, especially leaf stirrers, and also beam stirrers, anchor stirrers, finger stirrers or turbine stirrers. The agitating may, however, also be effected, for example, by circulatory pumping or by blowing through the uppermost part of the liquid column gases or vapors.

The new process permits of a high utilization of the apparatus and yields especially uniform products. In discontinuous polymerization, the contents of the vessel must always be brought to the polymerization temperature at the commencement of the polymerization and in most cases the heat of polymerization must be withdrawn by cooling during the polymerization. By the new process, heat is required only for heating up the material when setting the apparatus in operation. Furthermore almost all polymerizable organic compounds when polymerized in emulsion require a certain time before the polymerization commences. This initiation time is only necessary when setting the apparatus in operation when working by the continuous process. There is thus obtained a considerable increase in yield per unit of reaction space and time. In particular, the new process renders possible a simplification of the apparatus and its operation, because towers or tubular vessels are easier to prepare than the boilers of large diameter hitherto used and furthermore because the application of vessel covers of small diameter and of small stirring devices is considerably simpler than in the case of large diameter vessels and large stirrers. Moreover there is a considerable saving in energy since only a small portion of the whole emulsion is stirred.

By continuous polymerization according to this invention, the undesirable formation of coagulates is greatly reduced and in some cases practically completely prevented.

The following example will further illustrate how the said invention may be carried out in practice, but the invention is not restricted to this example. The parts are by volume.

Example

An enamelled pressure-tight vessel of 300 liters capacity and a height of 1.80 meters, in the upper part of which is provided a small rectangular leaf stirrer having an edge length of 20 centimeters which runs at 90 rotations per minute, is filled with a 20 per cent (by weight) emulsion of a mixture of 7 parts of liquefied vinyl chloride and 1 part of acrylic acid methyl ester in water containing in solution 1.3 per cent of alpha-hydroxy-octodecane sulphonic acid sodium salt and 0.3 per cent of potassium persulphate to such an extent that the stirrer is wholly immersed. The polymerization is initiated by heating up to 50° C. At the lower part of the pressure-tight vessel there is provided a connecting tube which opens into the top of an adjacent enamelled boiler of 30 liters capacity. This boiler, which serves for afterpolymerization, is completely filled with a 1 per cent solution of alpha-hydroxy-octodecane sulphonic acid sodium salt. When the polymerization in the 300 liter vessel has progressed to such an extent that the pressure gradually subsides, connection is established between the two vessels by opening a cock. In the course of every half hour, 4 liters of liquefied vinyl chloride, 0.6 liter of acrylic acid methyl ester and 9.4 liters of emulsifying liquid in which 120 grams of alpha-hydroxy-octodecane sulphonic acid sodium salt and 20 grams of sodium persulphate are dissolved are continuously supplied to the top of the 300 liter vessel. At the same rate, 13.6 kilograms of emulsion are continuously withdrawn during every half hour from the bottom of the 30 liter vessel. The temperature of both vessels is kept at 50° C. Care should be taken that the level of liquid in the 300 liter vessel remains as constant as possible and that the stirrer is always immersed in the liquid. An interpolymerization product is obtained containing 83 to 84 per cent of vinyl chloride, the yield being about 90 per cent, about 190 kilograms of polymerization product being obtained in 24 hours.

What I claim is:

1. In a process for continuously polymerizing in aqueous emulsion organic monomeric polymerizable compounds lighter than water and yielding a dispersion of polymerizates heavier than water, the steps which comprise carrying out the polymerization in a high column of the aqueous emulsion, continuously supplying the emulsion of the monomer in water at the top of the column, separating the monomer and the polymerization product formed into layers by concentration of the monomer in the top of the column of the emulsion and the polymerized product in the bottom due to their difference in specific gravity, withdrawing the dispersion of the polymerization product formed from the bottom of the column at the same rate as the emulsion is supplied to the top, and agitating only the uppermost part of the column of the emulsion liquid.

2. In a process for continuously polymerizing in aqueous emulsion organic polymerizable compounds lighter than water and yielding a dispersion of polymerizates heavier than water, the steps which comprise carrying out the polymerization in a high column of the aqueous emulsion, continuously supplying the polymerizable compounds and an emulsifying liquid therefor at the top of the column, separating the polymerizable compounds and the polymerization product formed into layers, by concentration of the polymerizable compounds in the top of the column of the emulsion liquid and the polymerization product in the bottom due to their difference in specific gravity, withdrawing the dispersion of the polymerization product formed from the bottom of the column at the same rate at which the polymerizable compounds and emulsifying liquid are supplied to the top of the column, and agitating the uppermost part only of the column of emulsion liquid.

3. The process of claim 1 wherein the reaction liquid is confined in separate superposed zones and wherein the polymerization product passes from one zone to another through a restricted passage.

4. The process of claim 1 wherein the reaction liquid is confined in separate laterally disposed zones and wherein the polymerization product passes from the bottom of one zone to the top of another through a restricted passage.

5. In a process for continuously polymerizing in aqueous emulsion a mixture of monomeric vinyl chloride and acrylic acid methyl ester, the steps which comprise carrying out the polymerization in a high column of the aqueous emulsion, continuously supplying the emulsion of the mixture in water at the top of the column, separating the monomers and the polymerization product formed into layers by concentration of the monomers in the top of the column of the emulsion and the polymerized product in the bottom due to their difference in specific gravity, withdrawing the dispersion of the polymerization product formed from the bottom of the column at the same rate as the emulsion is supplied to the top, and agitating only the uppermost part of the column of the emulsion liquid.

HANS FIKENTSCHER.